United States Patent
Nagashima et al.

(10) Patent No.: US 7,524,781 B2
(45) Date of Patent: Apr. 28, 2009

(54) NON-LEAD OPTICAL GLASS AND OPTICAL FIBER

(75) Inventors: Tatsuo Nagashima, Yokohama (JP); Naoki Sugimoto, Yokohama (JP); Seiki Ohara, Yokohama (JP); Tomoharu Hasegawa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 468 days.

(21) Appl. No.: 11/311,559

(22) Filed: Dec. 20, 2005

(65) Prior Publication Data

US 2006/0100084 A1     May 11, 2006

Related U.S. Application Data

(63) Continuation of application No. PCT/JP2004/004199, filed on Mar. 25, 2004.

(30) Foreign Application Priority Data

Jun. 20, 2003    (JP)   ............................. 2003-176110

(51) Int. Cl.
*C03C 3/15*     (2006.01)
*C03C 3/14*     (2006.01)

(52) U.S. Cl. .............................. 501/50; 501/37; 501/41; 501/49; 501/51; 501/52

(58) Field of Classification Search ................... 501/37, 501/41, 50, 51, 52, 49
See application file for complete search history.

(56) References Cited

U.S. PATENT DOCUMENTS

| | | | |
|---|---|---|---|
| 6,560,392 B2 | 5/2003 | Sugimoto et al. | |
| 6,599,852 B2 | 7/2003 | Kondo et al. | |
| 6,599,853 B2 | 7/2003 | Sugimoto et al. | |
| 6,620,748 B1 * | 9/2003 | Sugimoto et al. | 501/64 |
| 6,653,251 B2 | 11/2003 | Sugimoto et al. | |
| 6,656,584 B1 | 12/2003 | Sugimoto et al. | |
| 6,819,860 B2 | 11/2004 | Ohara et al. | |
| 7,098,158 B2 * | 8/2006 | Natsugari et al. | 501/78 |
| 7,341,965 B2 * | 3/2008 | Schreder et al. | 501/37 |
| 2003/0191006 A1 * | 10/2003 | Natsugari et al. | 501/49 |
| 2004/0254057 A1 * | 12/2004 | Schreder et al. | 501/53 |
| 2006/0100084 A1 | 5/2006 | Nagashima et al. | |

FOREIGN PATENT DOCUMENTS

| | | |
|---|---|---|
| EP | 1 103 530 | 5/2001 |
| EP | 1 127 858 | 8/2001 |
| EP | 1 302 450 A1 | 4/2003 |
| JP | 6-194533 | 7/1994 |
| JP | 9-20530 | 1/1997 |
| JP | 2001-213640 | 8/2001 |
| WO | WO 00/23392 | 4/2000 |
| WO | WO 01/40127 | 6/2001 |
| WO | WO 03/022766 A1 * | 3/2003 |
| WO | WO 2004/007385 | 1/2004 |

OTHER PUBLICATIONS

U.S. Appl. No. 11/589,805, filed Oct. 31, 2006, Hasegawa et al.

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, P.C.

(57) ABSTRACT

A non-lead optical glass consisting essentially of, as represented by mol %, from 45 to 75% of $Bi_2O_3$, from 12 to 45% of $B_2O_3$, from 1 to 20% of $Ga_2O_3$, from 1 to 20% of $In_2O_3$, from 0 to 20% of ZnO, from 0 to 15% of BaO, from 0 to 15% of $SiO_2+Al_2O_3+GeO_2$, from 0 to 15% of MgO+CaO+SrO, from 0 to 10% of $SnO_2+TeO_2+TiO_2+ZrO_2+Ta_2O_5+Y_2O_3+WO_3$ and from 0 to 5% of $CeO_2$, wherein $Ga_2O_3+In_2O_3+ZnO \geq 5\%$. An optical fiber comprising the above non-lead optical glass as a core.

5 Claims, No Drawings

US 7,524,781 B2

NON-LEAD OPTICAL GLASS AND OPTICAL FIBER

TECHNICAL FIELD

The present invention relates to a non-lead optical glass useful for a nonlinear optical element and an optical fiber.

BACKGROUND ART

To realize high information society and multimedia, processing of large volume information at very high speed is required, and for that purpose, optical processing technology which replaces conventional electronic processing is inevitable. To realize the optical processing technology, development of nonlinear optical elements such as wavelength conversion elements, supercontinuous white light generating elements and optical switching elements is in progress.

As a glass applicable to such nonlinear optical elements, a $Bi_2O_3$—$B_2O_3$—$SiO_2$—$Al_2O_3$—$Ga_2O_3$—$CeO_2$ glass has been proposed. For example, this glass is disclosed in Table 1 of JP-A-2001-213640.

The glass applicable to nonlinear optical elements is required to be an optical glass having a high third order nonlinear coefficient, and in order that the glass has a high third order nonlinear coefficient, it is effective to increase its refractive index. Further, the glass is also required to be free from lead.

A conventional glass having a refractive index n of 2.19 at a wavelength of 1,550 nm is disclosed as an example (Example 3, core) in Table 1 of JP-A-2001-213640, and the third order nonlinear coefficient of this conventional glass is considered to be relatively high.

When a nonlinear optical element is to be produced employing such a glass, it is required to prepare glass first and then to apply a heat treatment to the glass. For example, when an optical fiber is to be produced, usually a glass preform is prepared first, which is drawn while a heat treatment is applied thereto to produce an optical fiber.

However, the conventional glass has a problem in thermal stability such that it is likely to be crystallized when subjected to heat treatment.

It is an object of the present invention to provide an optical glass which solves such a problem and an optical fiber.

DISCLOSURE OF THE INVENTION

The present invention provides a non-lead optical glass consisting essentially of, as represented by mol % based on the following oxides, from 45 to 75% of $Bi_2O_3$, from 12 to 45% of $B_2O_3$, from 1 to 20% of $Ga_2O_3$, from 1 to 20% of $In_2O_3$, from 0 to 20% of ZnO, from 0 to 15% of BaO, from 0 to 15% of $SiO_2+Al_2O_3+GeO_2$, from 0 to 15% of MgO+CaO+SrO, from 0 to 10% of $SnO_2+TeO_2+TiO_2+ZrO_2+Ta_2O_3+Y_2O_3+WO_3$ and from 0 to 5% of $CeO_2$, wherein $Ga_2O_3+In_2O_3+ZnO$ is at least 5%.

The present invention further provides an optical fiber having a core and a cladding, wherein the core is made of the above non-lead optical glass.

The present inventors have found that a non-lead optical glass having a high n and excellent in the above thermal stability can be obtained by incorporating $In_2O_3$ into a $Bi_2O_3$—$B_2O_3$—$Ga_2O_3$ glass, and accomplished the present invention.

BEST MODE FOR CARRYING OUT THE INVENTION

The non-lead optical glass of the present invention (hereinafter referred to as the glass of the present invention) contains no lead or contains it in a content at an impurity level, and its content is typically 0.1% or lower as represented by mass percentage.

The glass of the present invention is useful for optical elements, particularly nonlinear optical elements such as wavelength conversion elements, supercontinuous white light generating elements (ultrawideband light sources by supercontinuous white light) and optical switching elements.

The above n of the glass of the present invention is preferably at least 2.10. If it is less than 2.10, the third order nonlinear coefficient tends to be low, and the waveguide length (the length of an optical fiber for example) required to obtain a desired nonlinear optical effect will be typically 100 m or longer, and such problems may arise that a local change of n is likely to occur due to a change in temperature, and the wavelength dispersion distribution in the lengthwise direction of an optical fiber tends to be significant. More preferably, n is at least 2.20.

The difference $\Delta T(=Tx-Tg)$ between the glass transition point Tg and the crystallization starting temperature Tx of the glass of the present invention is preferably at least 80° C. If $\Delta T$ is less than 80° C., thermal stability tends to be too low, and the glass is likely to be crystallized when subjected to a heat treatment, or crystals are likely to form in a large amount in a heat treated glass, whereby the transmission loss when light is transmitted through the glass tends to be great. $\Delta T$ is more preferably at least 100° C.

The above Tx is measured as follows. That is, the glass is ground to prepare a glass powder having particle sizes of from 74 to 106 μm as a sample, and its differential thermal curve is measured in an air atmosphere. The temperature-raising rate is 10° C./min, and the temperature is increased to a lower temperature between (Tg+300)° C. and 1,000° C.

When an exothermic peak accompanying crystal precipitation is confirmed in the obtained differential thermal curve, the temperature at which the exothermic peak arises is regarded as Tx. When no exothermic peak accompanying crystal precipitation is confirmed in the differential thermal curve, Tx is the maximum increased temperature, i.e. (Tg+300)° C. or 1,000° C.

As a differential thermometer to measure the differential thermal curve, THERMOFLEX DTA8121 manufactured by Rigaku Corporation may, for example, be mentioned. In such a case, the mass of the sample is preferably 1.0 g.

The glass of the present invention is excellent in thermal stability, and accordingly, when it is used to produce an optical fiber which is a supercontinuous white light generating element, tolerances for changes in the drawing temperature and the drawing rate can be made high. As a result, the wavelength dispersion distribution in the lengthwise direction of the optical fiber can be narrowed.

Now, the composition of the glass of the present invention will be describe with reference to the content as represented by mol %.

$Bi_2O_3$ is a component to increase n and essential. If $Bi_2O_3$ is less than 45%, n tends to be low, and if it exceeds 75%, vitrification tends to be difficult, or $\Delta T$ tends to be small.

$B_2O_3$ is a network former and essential. If $B_2O_3$ is less than 12%, vitrification tends to be difficult, and if it exceeds 45%, n tends to be low.

Ga$_2$O$_3$ is a component to increase ΔT and essential. If Ga$_2$O$_3$ is less than 1%, thermal stability tends to decrease, and if it exceeds 20%, vitrification tends to be difficult.

In$_2$O$_3$ is a component to increase n and to increase ΔT and essential. If In$_2$O$_3$ is less than 1%, thermal stability tends to decrease, or n tends to be low, and it is preferably at least 2%. If In$_2$O$_3$ exceeds 20%, vitrification tends to be difficult, and it is preferably at most 13%.

ZnO is not essential but may be incorporated in an amount of up to 20% so as to facilitate vitrification. If ZnO exceeds 20%, crystals may be likely to precipitate when the glass is melted, whereby the transmittance of the glass may decrease, and it is preferably at most 18%. When ZnO is incorporated, its content is preferably at least 1%.

BaO is not essential but may be incorporated in an amount of up to 15% so as to facilitate vitrification. If BaO exceeds 15%, crystals may be likely to precipitate when the glass is melted, and it is preferably at most 10%, more preferably at most 6%. When BaO is incorporated, its content is preferably at least 1%.

Each of SiO$_2$, Al$_2$O$_3$ and GeO$_2$ is not essential, but they may be incorporated in a total amount of up to 15% so as to increase Tg, to adjust the coefficient of expansion or to increase ΔT. If the total content of such three components exceeds 15%, crystals may be likely to precipitate when the glass is melted. Such a total amount is preferably at most 10%.

In a case where n should be further higher, it is preferred that SiO$_2$ and/or Al$_2$O$_3$ is not incorporated, and it is more preferred that none of SiO$_2$, Al$_2$O$_3$ and GeO$_2$ are incorporated.

Each of MgO, CaO and SrO is not essential, but they may be incorporated in a total amount of up to 15% so as to facilitate vitrification. If the total content of such three components exceeds 15%, crystals may be likely to precipitate when the glass is melted. Such a total amount is preferably at most 10%.

Each of SnO$_2$, TeO$_2$, TiO$_2$, ZrO$_2$, Ta$_2$O$_3$, Y$_2$O$_3$ and WO$_3$ is not essential, but they may be incorporated in a total amount of up to 10% so as to increase n. If the total content of such seven components exceeds 10%, crystals may be likely to precipitate when the glass is melted. Such a total amount is preferably at most 5%.

CeO$_2$ is not essential but may be incorportated in an amount of up to 5% so as to inhibit Bi$_2$O$_3$ in the glass composition from being reduced during melting of the glass and precipitating as metal bismuth, thereby to decrease transparency of the glass. If CeO$_2$ exceeds 5%, vitrification tends to be difficult, or the glass tends to be colored deep yellow or orange, thereby to decrease the transmittance of the glass. It is preferably at most 3%.

When CeO$_2$ is incorporated, its content is preferably at least 0.01%, more preferably at least 0.05%, particularly preferably at least 0.1%.

In a case where the above decrease in transmittance of the glass due to coloring should be avoided, the CeO$_2$ content is preferably less than 0.15%, and it is more preferred that substantially no CeO$_2$ is incorporated.

The glass of the present invention consists essentially of the above components, but may contain other components within a range not to impair the purpose of the present invention. The total content of said other components is preferably at most 20%, more preferably at most 15%.

For example, when an optical waveguide is prepared by applying a known two-stage thermal ion exchange method disclosed by e.g. JP-A-6-194533 to the glass of the present invention, one or more alkali metal oxides (R$_2$O) of Li$_2$O, Na$_2$O and K$_2$O are preferably incorporated, and when the ion exchange is carried out by employing a silver-containing melt, P$_2$O$_5$ in addition to R$_2$O is preferably incorporated.

When R$_2$O is incorporated, the total content is preferably from 5 to 17%. If the total R$_2$O content is less than 5%, the difference in refractive index caused by the ion exchange may be too small, and it is more preferably at least 8%. If the total content exceeds 17%, chemical durability tends to be poor, and vitrification tends to be difficult, or n tends to be low, and it is more preferably at most 15%.

When R$_2$O is incorporated in an amount of 5% or more, the Bi$_2$O$_3$ content is preferably at most 55%. If the Bi$_2$O$_3$ content exceeds 55%, vitrification may be difficult.

Further, if P$_2$O$_5$ is incorporated, its content is preferably at most 10%. If the content exceeds 10%, chemical durability tends to be poor, vitrification tends to be difficult, or n tends to be low.

In a case where the glass of the present invention is used for an application wherein the wavelength dispersion distribution in the optical fiber lengthwise direction should be narrow, such as a supercontinuous white light generating element, or it is used for an optical waveguide employing an ion exchange method, etc., it is preferred that Bi$_2$O$_3$ is from 45 to 55%, BaO is from 0 to 10%, MgO+CaO+SrO is from 0 to 10%, and CeO$_2$ is from 0.1 to 3%.

In a case where the glass of the present invention is used for a so-called rectangular nonlinear optical element optical fiber having a length of from 1 cm to 100 m for example, etc., it is preferred that Bi$_2$O$_3$ is more than 55% and not more than 75%, B$_2$O$_3$ is from 12 to 20%, Ga$_2$O$_3$ is from 3 to 18%, In$_2$O$_3$ is from 2 to 13%, ZnO is from 0 to 13%, BaO is from 0 to 3%, SiO$_2$+Al$_2$O$_3$+GeO$_2$ is from 0 to 6%, MgO+CaO+SrO is from 0 to 10%, SnO$_2$+TeO$_2$+TiO$_2$+ZrO$_2$+Ta$_2$O$_3$+Y$_2$O$_3$+WO$_3$ is from 0 to 5%, and CeO$_2$ is from 0.1 to 1%.

In a case where the glass of the present invention is used for a rectangular nonlinear optical element optical fiber, the wavelength dispersion distribution of which in the optical fiber lengthwise direction should be narrow, etc., it is preferred that Bi$_2$O$_3$ is more than 55% and not more than 75%, B$_2$O$_3$ is more than 20% and not more than 45%, In$_2$O$_3$ is from 2 to 13%, ZnO is from 0 to 18%, BaO is from 0 to 6%, SiO$_2$+Al$_2$O$_3$+GeO$_2$ is from 0 to 10%, MgO+CaO+SrO is from 0 to 10%, SnO$_2$+TeO$_2$+TiO$_2$+ZrO$_2$+Ta$_2$O$_3$+Y$_2$O$_3$+WO$_3$ is from 0 to 5%, and CeO$_2$ is from 0.1 to 3%.

The glass of the present invention may be produced by a sol-gel process, by sputtering, by a vapor deposition method such as CVD, or the like.

Now, the optical fiber of the present invention will be explained below.

The core diameter and the cladding diameter of the optical fiber of the present invention are typically from 1 to 10 μm and from 50 to 500 μm, respectively.

In the optical fiber of the present invention, the refractive index n$_2$ of the cladding glass at a wavelength of 1,550 nm and the refractive index n$_1$ of the core glass at the same wavelength preferably satisfy the following relation:

$$0.0005 \leq (n_1 - n_2)/n \leq 0.2$$

Further, the core glass is made of the glass of the present invention, and the cladding glass is also preferably made of the glass of the present invention.

The absolute value |ΔTg| of the difference in Tg between the core glass and the cladding glass is preferably at most 15° C. If |ΔTg| exceeds 15° C., molding at the time of preparation of the fiber may be difficult. |ΔTg| is more preferably at most 10° C., particularly preferably at most 5° C.

The difference $(\alpha_1-\alpha_2)$ between the average coefficient of linear expansion $\alpha_1$ from 50 to 300° C. of the core glass and the average coefficient of thermal expansion $\alpha_2$ at the same temperature of the cladding glass is preferably from $-3\times10^{-7}$ to $15\times10^{-7}/°$ C. If $(\alpha_1-\alpha_2)$ is out of this range, problems such as thermal fracture may arise at the time of preparation of the preform. It is more preferably from 0 to $10\times10^{-7}/°$ C., particularly preferably from 0 to $5\times10^{-7}/°$ C.

The third order nonlinear coefficient γ of the optical fiber of the present invention is preferably at least 200 $W^{-1}$ $km^{-1}$. If γ is less than 200 $W^{-1}$ $km^{-1}$, no sufficient phase rotation φ may be obtained. For example, assuming use under preferred conditions with an incident light power of at most 100 mW and an optical fiber length of at most 100 m, if γ is less than 200 $W^{-1}$ $km^{-1}$, φ cannot be at least 2 rad. γ is more preferably at least 400 $W^{-1}$ $km^{-1}$, more preferably at least $800^{-1}$ $km^{-1}$, particularly preferably at least 1,000 $W^{-1}$ $km^{-1}$.

In the optical fiber of the present invention, the nonlinear refractive index n' of the core glass is preferably at least $4\times10^{-19}$ $m^2$ $W^{-1}$. If n' is less than $4\times10^{-19}$ $m^2$ $W^{-1}$, a high γ is less likely to be obtained. It is more preferably at least $6\times10^{-19}$ $m^2$ $W^{-1}$, particularly preferably at least $8\times10^{-19}$ $m^2$ $W^{-1}$.

The effective core area A of the optical fiber of the present invention is preferably at most 10 $\mu m^2$. If A exceeds 10 $\mu m^2$, a high γ is less likely to be obtained, and it is more preferably at most 5 $\mu m^2$. Further, A is preferably at least 3 $\mu m^2$. If A is less than 3 $\mu m^2$, the connection loss may be significant when the optical fiber is connected to a quartz glass single mode fiber.

In the optical fiber of the present invention, it is preferred that $|\Delta Tg|$ is at most 15° C., $(\alpha_1-\alpha_2)$ is from $-3\times10^{-7}$ to $15\times10^{-7}/°$ C., and $(n_1-n_2)$ is at least 0.03. If $(n_1-n_2)$ is less than 0.03, A may be large, and it is preferably at least 0.05. Further, it is more preferred that $|\Delta Tg|$ is at most 10° C., and $(\alpha_1-\alpha_2)$ is from 0 to $10\times10^{-7}/°$ C., and it is particularly preferred that $|\Delta Tg|$ is at most 5° C., and $(\alpha_1-\alpha O_2)$ is from 0 to $5\times10^{-7}/°$ C.

The method for producing the optical fiber of the present invention is not particularly limited, and the optical fiber is produced, for example, as follows.

Predetermined raw materials are mixed and put in a gold crucible, a platinum crucible, an alumina crucible, a quartz crucible or an iridium crucible and melted in an air atmosphere at from 800 to 1,300° C. The obtained molten glass is cast in a predetermined mold and combined with a cladding glass to prepare a preform. The preform is drawn to prepare an optical fiber. Otherwise, the molten glass may be molded into a plate, which is extruded to prepare a preform, and an optical fiber is prepared employing such a preform.

EXAMPLES

Raw materials were formulated and mixed so that the composition would be as shown by mol % in lines from $Bi_2O_3$ to $CeO_2$ in Tables to prepare a formulated material. This formulated material was put in a platinum crucible and held in an air atmosphere at 1,100° C. for 2 hours and melted, the obtained molten glass was casted in a plate shape and held for 4 hours at a temperature as shown by ° C. in a line Tg in Tables and then cooled to room temperature for annealing. Examples 1 to 23 and 26 to 34 are Examples of the present invention, Example 24 is a Comparative Example, and Example 25 represents a Comparative Example in which the above conventional glass was prepared.

With respect to the obtained glass, Tg (unit: ° C.) and ΔT (unit: ° C.) were measured by means of differential thermal analysis, the average coefficient of linear expansion α from 50 to 300° C. (unit: $\times10^{-7}/°$ C.) was measured by a thermomechanical analyzer (TMA), and the density d (unit: $g/cm^3$) was measured by a specific gravity measuring apparatus SGM-300 manufactured by Shimadzu Corporation.

Further, the obtained glass was processed into a plate with a thickness of 2 mm and a size of 20 mm×20 mm, and each side was mirror polished to prepare a sample plate, and the refractive index n to a light having a wavelength of 1,550 nm was measured by using a prism coupler model 2010 manufactured by Metricon Corp.

Results of the above measurements are shown in Tables ("-"in Tables means no measurement conducted).

Further, an optical fiber employing the glass of Example 29 as a core glass and the glass of Example 26 as a cladding glass was prepared as follows.

First, the glass of Example 29 was melted and discharged into a cylindrical mold (a cylindrical mold with a bottom) made of SUS310S with an inner diameter of 10 mm and a height of 180 mm, and annealed to prepare a rod-shape glass. The melting and annealing were carried out in the same manner as described above.

Then, the rod-shape glass was redrawn at 445° C. to prepare a rod glass with a diameter of 5 mm.

Separately, four glass tubes with an outer diameter of 15 mm, an inner diameter of 7 mm and a height of 150 mm, made of the glass of Example 26, were prepared.

The above rod glass was put in one of the glass tubes, and the glass tube and the rod glass were simultaneously redrawn at 445° C. while the interior of the glass tube was kept in vacuum by a vacuum pump, to prepare a glass rod with a diameter of 5 mm.

The obtained glass rod was put in one of the other three glass tubes, and the glass rod and the glass tube were redrawn in the same manner to prepare a glass rod with a diameter of 5 mm.

Using the other two glass tubes, the above operation was repeated two times to prepare a preform with a core diameter of 0.07 mm and an outer diameter of 5 mm.

The resulting preform was drawn at 445° C. to prepare an optical fiber with a core diameter of 1.85 mm and a fiber diameter of 125 μm.

As the mode field diameter of the optical fiber is 2.5 μm, the effective core area A is 4.85 $\mu m^2$.

The third order nonlinear susceptibility $X^{(3)}$ of the core glass is estimated to be $8.24\times10^{-9}$ esu by means of the Miller law from the value n.

Further, n' and $X^{(3)}$ empirically satisfy the following formula. That is, $n'=9.28\times10^{11}\times X^{(3)}$. Accordingly, n' is estimated to be $7.65\times10^{-19}$ $m^2$ $W^{-1}$.

Further, γ of the optical fiber at a wavelength of 1,550 nm is estimated to be 639 $W^{-1}$ $km^{-1}$ from the above values A and n'.

Further, an optical fiber employing the glass of Example 31 as a core glass and the glass of Example 34 as a cladding glass was prepared in the same manner as for preparation of the optical fiber employing the glass of Example 29 as a core glass and the glass of Example 26 as a cladding glass.

However, the operation of redrawing the rod-shape glass to prepare a rod glass with a diameter of 5 mm was carried out at 430° C., and the operation of putting the rod glass in one of the glass tubes and redrawing the glass tube and the rod glass simultaneously while the interior of the glass tube was kept in vacuum by a vacuum pump to prepare a glass rod with a diameter of 5 mm, was carried out at 440° C.

The optical fiber thus obtained had a core diameter of 1.72 μm and a fiber diameter of 125 μm. Further, as the mode field diameter of the optical fiber is 2.0 μm, the effective core area A is 3.3 μm².

γ of the optical fiber at a wavelength of 1,550 nm was measured by four-wave mixing. That is, employing a light having a wavelength of 1,550 nm as a pump light, signal lights having wavelengths departing from the pump light wavelength by every 0.5 nm, i.e. 1,549.5 nm, 1,549 nm and 1,548.5 nm, were made to simultaneously enter the optical fiber (length: 2 m) through a coupler, and the output was observed by an optical spectrum analyzer. On that occasion, the ratio r of the idler light and the signal lights was measured.

The value γ was estimated from the following relational expression between r and γ and as a result, γ was 1,360 W⁻¹ km⁻¹. In the following formula, $P_{av}$ is the average pump power through the fiber, and z is the length of the optical fiber:

$$r = (\gamma P_{av} z)^2$$

Further, n' of the optical fiber at a wavelength of 1,550 nm was estimated to be $1.1 \times 10^{-18}$ m² W⁻¹ from the above values A and γ.

TABLE 1

|  | Ex. 1 | Ex. 2 | Ex. 3 | Ex. 4 | Ex. 5 | Ex. 6 | Ex. 7 |
|---|---|---|---|---|---|---|---|
| $Bi_2O_3$ | 54.73 | 54.73 | 54.73 | 54.73 | 54.73 | 55.72 | 55.72 |
| $B_2O_3$ | 22.39 | 22.39 | 22.39 | 22.39 | 22.39 | 22.39 | 21.89 |
| $Ga_2O_3$ | 9.95 | 7.96 | 4.97 | 5.96 | 6.96 | 6.96 | 8.95 |
| $In_2O_3$ | 4.97 | 4.97 | 4.97 | 4.98 | 4.98 | 4.98 | 4.98 |
| ZnO | 5.47 | 7.46 | 7.46 | 7.46 | 7.46 | 5.97 | 5.97 |
| BaO | 1.99 | 1.99 | 1.99 | 1.99 | 1.99 | 1.99 | 1.99 |
| $SiO_2$ | 0 | 0 | 0 | 0 | 0 | 0 | 0 |
| $Al_2O_3$ | 0 | 0 | 0 | 0 | 0 | 0 | 0 |
| $Na_2O$ | 0 | 0 | 2.99 | 1.99 | 0.99 | 1.49 | 0 |
| $CeO_2$ | 0.5 | 0.5 | 0.5 | 0.5 | 0.5 | 0.5 | 0.5 |
| Tg | 367 | 359 | 351 | 362 | 370 | 363 | 377 |
| ΔT | 125 | 115 | 115 | 120 | 115 | 110 | 110 |
| n | 2.137 | 2.144 | 2.137 | 2.138 | 2.141 | 2.142 | 2.150 |
| d | — | — | — | — | — | — | — |
| α | 106.49 | 106.16 | 116.70 | 111.83 | 106.03 | 110.74 | 103.14 |

TABLE 2

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| $Bi_2O_3$ | 59.82 | 62.14 | 62.18 | 62.31 | 62.31 | 62.31 | 63.67 | 63.67 | 64.31 |
| $B_2O_3$ | 17.45 | 16.01 | 17.41 | 17.45 | 19.94 | 17.45 | 16.42 | 13.43 | 20.44 |
| $Ga_2O_3$ | 7.48 | 5.83 | 4.98 | 7.47 | 9.97 | 9.97 | 5.97 | 5.97 | 4.99 |
| $In_2O_3$ | 4.98 | 5.83 | 9.95 | 4.99 | 4.99 | 4.99 | 5.97 | 5.97 | 4.98 |
| ZnO | 7.48 | 4.85 | 2.49 | 4.99 | 0 | 0 | 4.98 | 4.98 | 2.49 |
| BaO | 2.49 | 4.85 | 2.49 | 2.49 | 2.49 | 2.49 | 2.49 | 2.49 | 2.49 |
| $SiO_2$ | 0 | 0 | 0 | 0 | 0 | 0 | 0 | 0 | 0 |
| $Al_2O_3$ | 0 | 0 | 0 | 0 | 0 | 0 | 0 | 2.99 | 0 |
| $SnO_2$ | 0 | 0 | 0 | 0 | 0 | 2.49 | 0 | 0 | 0 |
| $CeO_2$ | 0.3 | 0.49 | 0.5 | 0.3 | 0.3 | 0.3 | 0.5 | 0.5 | 0.3 |
| Tg | 360 | 345 | 365 | 360 | 360 | 360 | 352 | 355 | 350 |
| ΔT | 105 | 125 | 100 | 100 | 120 | 110 | 110 | 110 | 80 |
| n | 2.193 | 2.201 | 2.208 | 2.194 | 2.176 | 2.188 | 2.210 | 2.205 | 2.202 |
| d | 7.870 | 7.927 | 7.929 | 7.883 | 7.786 | 7.853 | 7.976 | 7.933 | 7.939 |
| α | — | — | — | — | — | — | 108.03 | — | — |

TABLE 3

|  | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|
| $Bi_2O_3$ | 64.81 | 64.81 | 64.81 | 64.81 | 64.81 | 65.31 | 67.30 | 59.81 | 60.1 |
| $B_2O_3$ | 19.94 | 17.45 | 17.45 | 17.45 | 19.93 | 16.85 | 17.45 | 19.94 | 29.6 |
| $Ga_2O_3$ | 9.97 | 9.96 | 7.47 | 2.49 | 4.99 | 6.12 | 7.47 | 0 | 4.0 |
| $In_2O_3$ | 2.49 | 4.99 | 4.99 | 9.97 | 4.99 | 6.12 | 4.99 | 0 | 0 |
| ZnO | 0 | 0 | 2.49 | 2.49 | 2.49 | 5.10 | 0 | 14.96 | 0 |
| BaO | 2.49 | 2.49 | 2.49 | 2.49 | 2.49 | 0 | 2.49 | 4.99 | 0 |
| $SiO_2$ | 0 | 0 | 0 | 0 | 0 | 0 | 0 | 0 | 5.0 |
| $Al_2O_3$ | 0 | 0 | 0 | 0 | 0 | 0 | 0 | 0 | 1.0 |
| $SnO_2$ | 0 | 0 | 0 | 0 | 0 | 0 | 0 | 0 | 0 |
| $CeO_2$ | 0.3 | 0.3 | 0.3 | 0.3 | 0.3 | 0.6 | 0.3 | 0.3 | 0.3 |
| Tg | 355 | 345 | 355 | 355 | 350 | 355 | 355 | 325 | 340 |
| ΔT | 105 | 115 | 105 | 120 | 105 | 80 | 100 | 105 | 55 | 63 |
| n | 2.187 | 2.196 | 2.206 | 2.219 | 2.202 | 2.215 | 2.212 | 2.200 | 2.190 |
| d | 7.844 | 7.896 | 7.953 | 8.040 | 7.939 | 8.004 | 7.998 | 7.885 | — |
| α | — | — | — | — | — | — | — | — | — |

TABLE 4

|  | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|
| $Bi_2O_3$ | 55.89 | 55.89 | 60.38 | 63.18 | 65.37 | 65.37 | 65.37 | 65.37 | 55.89 |
| $B_2O_3$ | 21.46 | 21.96 | 18.46 | 15.92 | 13.97 | 13.97 | 13.97 | 13.97 | 22.95 |
| $Ga_2O_3$ | 7.98 | 8.98 | 9.98 | 8.96 | 9.48 | 9.48 | 9.48 | 9.48 | 9.98 |
| $In_2O_3$ | 3.99 | 4.98 | 6.98 | 5.97 | 5.99 | 5.99 | 5.99 | 5.99 | 2.5 |
| ZnO | 5.99 | 5.99 | 2.0 | 3.48 | 3.49 | 3.49 | 3.49 | 3.49 | 3.99 |
| BaO | 2.49 | 0 | 0 | 1.99 | 1.5 | 0 | 0 | 0 | 3.49 |
| $Al_2O_3$ | 1.0 | 0 | 0 | 0 | 0 | 0 | 0 | 0 | 0 |
| $SiO_2$ | 0 | 0 | 0 | 0 | 0 | 0 | 0 | 0 | 0 |
| MgO | 0 | 2.0 | 2.0 | 0 | 0 | 1.5 | 0 | 0 | 0 |
| CaO | 0 | 0 | 0 | 0 | 0 | 0 | 1.5 | 0 | 0 |
| SrO | 0 | 0 | 0 | 0 | 0 | 0 | 0 | 1.5 | 0 |
| $Na_2O$ | 1.0 | 0 | 0 | 0 | 0 | 0 | 0 | 0 | 1.0 |
| $CeO_2$ | 0.2 | 0.2 | 0.2 | 0.5 | 0.2 | 0.2 | 0.2 | 0.2 | 0.2 |
| Tg | 364 | 381 | 384 | 365 | 368 | 369 | 370 | 367 | 369 |
| ΔT | 132 | 126 | 122 | 133 | 127 | 121 | 127 | 125 | 136 |
| n | 2.141 | 2.154 | 2.184 | 2.199 | 2.218 | 2.220 | 2.218 | 2.219 | 2.133 |
| d | — | — | 7.927 | 7.853 | 8.016 | — | — | — | — |
| α | 111 | 103 | 106 | 111 | 112 | 113 | — | — | 111 |

INDUSTRIAL APPLICABILITY

According to the present invention, a non-lead optical glass having a high refractive index and thereby considered to have a high third order nonlinear coefficient, and excellent in thermal stability at the time of a heat treatment can be obtained. Further, an optical fiber with a large difference in refractive index between the core glass and the cladding glass can be obtained.

The entire disclosure of Japanese Patent Application No. 2003-176110 filed on Jun. 20, 2003 including specification, claims, and summary is incorporated herein by reference in its entirety.

What is claimed is:

1. A non-lead optical glass having a refractive index of at least 2.10 at a wavelength of 1,550 nm, consisting essentially of, as represented by mol % based on the following oxides, from 45 to 75% of $Bi_2O_3$, from 12 to 45% of $B_2O_3$, from 1 to 20% of $Ga_2O_3$, from 1 to 20% of $In_2O_3$, from 0 to 20% of ZnO, from 0 to 15% of BaO, from 0 to 2.99% of $SiO_2+Al_2O_3+GeO_2$, from 0 to 15% of MgO+CaO+SrO, from 0 to 10% of $SnO_2+TeO_2+TiO_2+ZrO_2+Ta_2O_5+Y_2O_3+WO_3$ and from 0 to 5% of $CeO_2$, wherein $Ga_2O_3+In_2O_3+ZnO$ is at least 5%.

2. The non-lead optical glass according to claim 1, wherein $Bi_2O_3$ is from 45 to 55%, BaO is from 0 to 10%, MgO+CaO+SrO is from 0 to 10%, and $CeO_2$ is from 0.1 to 3%.

3. The non-lead optical glass according to claim 1, wherein $Bi_2O_3$ is more than 55% and not more than 75%, $B_2O_3$ is from 12 to 20%, $Ga_2O_3$ is from 3 to 18%, $In_2O_3$ is from 2 to 13%, ZnO is from 0 to 13%, BaO is from 0 to 3%, $SiO_2+Al_2O_3+GeO_2$ is from 0 to 2.99%, MgO+CaO+SrO is from 0 to 10%, $SnO_2+TeO_2+TiO_2+ZrO_2+Ta_2O_5+Y_2O_3+WO_3$ is from 0 to 5%, and $CeO_2$ is from 0.1 to 1%.

4. The non-lead optical glass according to claim 1, wherein $Bi_2O_3$ is more than 55% and not more than 75%, $B_2O_3$ is more than 20% and not more than 45%, $In_2O_3$ is from 2 to 13%, ZnO is from 0 to 18%, BaO is from 0 to 6%, $SiO_2+Al_2O_3+GeO_2$ is from 0 to 1.0%, MgO+CaO+SrO is from 0 to 10%, $SnO_2+TeO_2+TiO_2+ZrO_2+Ta_2O_5+Y_2O_3+WO_3$ is from 0 to 5%, and $CeO_2$ is from 0.1 to 3%.

5. An optical fiber having a core and a cladding, wherein the core is made of the non-lead optical glass as defined in claim 1.

* * * * *